United States Patent [19]
Noone

[11] Patent Number: 5,549,940
[45] Date of Patent: Aug. 27, 1996

[54] STOCK MOTOR VEHICLE OUTFITTED WITH A SPORTS THEME KIT

[76] Inventor: Robert P. Noone, 275 Christopher Dr., Scranton, Pa. 18504

[21] Appl. No.: 398,880

[22] Filed: Mar. 6, 1995

[51] Int. Cl.⁶ .................................................. B60R 13/04
[52] U.S. Cl. ........................ 428/31; 40/592; 40/593; 206/579; 428/43; 428/79; 428/542.8
[58] Field of Search .................. 428/31, 79, 43, 428/542.8; 40/591, 592, 593; 206/575, 579

[56] References Cited

U.S. PATENT DOCUMENTS

| | | | |
|---|---|---|---|
| D. 84,075 | 5/1931 | Doherty | D12/83 |
| D. 134,309 | 11/1942 | Robinson | D12/83 |
| D. 231,523 | 4/1974 | Baker | D12/83 |
| D. 231,911 | 6/1974 | Baker | D12/83 X |
| D. 300,617 | 4/1989 | Baker | D12/83 |
| 1,592,557 | 7/1926 | Conner | 428/209 |
| 2,939,242 | 6/1960 | Papadakis | 428/914 X |
| 3,504,169 | 3/1970 | Freeburger | 428/19 X |
| 3,869,332 | 2/1975 | Loew | 428/31 |
| 4,164,087 | 8/1979 | Crownover | 428/31 X |
| 4,582,017 | 4/1986 | Ostermiller | 40/591 X |
| 4,601,255 | 7/1986 | Marcotti | 40/591 X |
| 4,736,981 | 4/1988 | Barton et al. | 428/79 X |
| 5,016,145 | 5/1991 | Singleton | 428/31 X |
| 5,086,516 | 2/1992 | Baxter et al. | 428/79 X |
| 5,270,088 | 12/1993 | Grasse | 428/31 X |

*Primary Examiner*—Henry F. Epstein
*Attorney, Agent, or Firm*—Richard C. Litman

[57] ABSTRACT

A kit to outfit a stock motor vehicle with decorative features related to a sports team. Embodiments of the kit include one to accommodate any motor vehicle and make or model, a second tailored to a specific manufacturer's make and model of vehicle, a third to provide an after-market customizing kit. Each of the kit items are coordinated to display the colors, identifying features, mascots, playing implements, or other indicia related to a sports team or sports figure. Items include a wide adhesive tape decorated with a plurality of stripes for application to the exterior of a motor vehicle; a decorative hood ornament; wheel cover decals; stickers and signs displaying a team name or logo, for both permanent and temporary application; a string of decorative mini-lights; sunvisor decals; decorative floor mats; decorative seat covers; a decorative gear shift lever knob; and a decorative clock. The sports indicia are applied to magnetic flexible sheet materials for temporary use, or to plastic sheet material with permanent adhesive backings for permanent application. Additional items include an ice chest form-fitted to the interior of the tailgate storage area of a motor vehicle and additional direct current electrical plug outlets for retrofit installation into a motor vehicle.

13 Claims, 4 Drawing Sheets

STOCK MOTOR VEHICLE OUTFITTED WITH A SPORTS THEME KIT

BACKGROUND OF THE INVENTION

1. Field of the Invention

The present invention relates to a kit for outfitting stock motor vehicles with a sports theme to enhance the enjoyment of sporting events and tailgate parties and promote sports team enthusiasm.

2. Description of the Prior Art

Stock motor vehicle manufacturing and sports franchising are both big business concerns. Both industries budget huge sums of money to advertise and promote sales of their respective products to the general public or fans. For example, sports governing bodies, such as the National Football League, Major League Baseball, NASCAR, NCAA and the National Hockey League, routinely license their rights to allow marketing of official promotional items. Typically, a broad range of items are sold, such as sweatshirts, mugs, hats, pennants, or sports playing implements, each which usually bears the indicia of a sports team or sports figure, its logo or its trademark. Likewise, major stock motor vehicle manufacturers market their own trademarks and identifying indicia on promotional items in order to sell their stock motor vehicle and NASCAR related products.

Furthermore, many consumers are loyal fans, whether they be fans of a particular sports team or of a particular stock motor vehicle manufacturer, and over extended periods of time, spend a significant amount of money on both the paraphernalia promoting the product as well as the product being promoted, e.g. sporting event tickets, alumni activities, or stock motor vehicles. The present invention recognizes the benefit to the stock motor vehicle industry and the sports franchise industry by creating a means of promoting the merchandizing of both industries' products through a kit which may either be installed by the automobile manufacturer for sale with the vehicle or as a retrofit aftermarket product.

The prior art fails to reveal a stock motor vehicle that features a sports theme, or a kit to promote sports enthusiasm for use with a motor vehicle put to its ordinary use. U.S. Pat. No. 4,601,255 issued Jul. 22, 1986 to Marcotti describes a signal flag or pennant for use at sporting events consisting of an elongated flag staff on which is attached a hollow transparent flat envelope into which is inserted a flag, pennant or bumper sticker. After use, the bumper sticker may be removed from the device for application to a vehicle. U.S. Pat. No. 4,582,017 issued Apr. 315, 1986 to Ostermiller also describes a sporting event flag that includes a fabric flag attached to a flagstaff and a structure for clamping it to an automobile.

Three U.S. patents to Baker each describe a vehicle that exhibits a sports related design, but none apply to vehicles for ordinary road use. U.S. Pat. No. D300,617 issued Apr. 11, 1989 to Baker shows an ornamental design in which a vehicle is wearing a football helmet over where the hood, windshield and passenger roof areas ordinarily would be found. This design would not only be unfeasible as a stock car modification, but would be unsafe and not aerodynamic. U.S. Pat. No. D231,911 issued Jun. 25, 1974 to Baker shows an ornamental design for a novelty cart in which the body is shaped like a baseball wearing a cap. U.S. Pat. No. D231,523 issued Apr. 30, 1974 to Baker shows an ornamental design for a novelty cart in which the body is shaped like a football helmet which displays a five pointed star.

U.S. Pat. No. D134,309 issued Oct. 1, 1941 to Robinson shows an ornamental design for an automobile body featuring a hood and fenders shaped and ornamented like a bird's head, wings and body feathers. U.S. Pat. No. D84,075 issued Dec. 15, 1930 to Doherty shows an ornamental design for an automobile body featuring silhouettes of horses, riders and dogs on the side and rear body panels. U.S. Pat. No. 1,592,557 issued Nov. 19, 1925 to Connor describes a chemical treatment and coating method of decorating sheet metal.

None of the above referenced inventions and patents, taken either singly or in combination, is seen to describe the instant invention as claimed.

SUMMARY OF THE INVENTION

The present invention is directed to a kit which outfits a stock motor vehicle with devices to enthuse fans of a sports franchise, sports team or sports figure. A first embodiment of the kit accommodates any motor vehicle make or model. A second embodiment of the kit would be installed by the dealer or manufacturer of the vehicle at the time of purchase; the kit customizes the motor vehicle features of specific makes and models. A third embodiment is a variation of the first and second embodiments to provide an after-market customizing kit.

The kit is made up of decorative devices for a motor vehicle which are all coordinated to represent the colors, mascots, playing paraphernalia and other identifying indicia of a sports team or its governing body. As is well known, every sport has its own often distinctively decorated and well known playing implements; for example, football has helmets with logos, official NFL footballs, and multicolor jerseys; hockey has official pucks, ornamented hockey sticks and multicolor jerseys; and baseball has baseballs, bats and baseball caps. More specifically and for example, the "Fighting Irish" football team of Notre Dame University sport gold helmets, have a leprechaun as a mascot and shamrocks as an identifying feature; the Philadelphia Phillies baseball team sport red and white baseball caps, have a distinctive "P" logo and wear pinstripe jerseys; the Washington Capitals hockey team sport red, white and blue jerseys, and have a distinctive "Capitals" logo displaying a hockey stick. These playing implement shapes and color combinations decorate a number of devices, which are combined for outfitting a motor vehicle with a sports theme.

In the first embodiment, the kit would include decorative items for both the inside and outside of the vehicle. Items in the kit for exterior features would include (1) a wide adhesive tape decorated with a plurality of stripes in the team's colors to serve as an accent stripe for the side or other exterior parts of a motor vehicle; (2) a hood ornament, shaped as the mascot of the team, or if no mascot is available, the team's logo on a playing implement such as a helmet or ball; (3) hub cap decals displaying the logo or trademark of the sports team's governing body, and (4) stickers and signs displaying a team name or logo, for both permanent and temporary application. Some of the team name or logo signs in the kit are fabricated from magnetic sheets that temporarily adhere to ferrous exterior body panels of the vehicle; the kit also includes standard plastic sheet material with permanent adhesive backings for application to non-ferrous body panels.

Devices in the kit for interior ornamentation include (1) a string of mini-lights with a means of attachment to glass adapted for use with a motor vehicle plug outlet, (2) adhesive sunvisor decals, (3) floor mats displaying the team colors and logo, (4) seat covers displaying the team colors and logo, (5) a gear shift lever knob in the shape of a ball or other scoring implement, (6) a clock shaped in the form of a helmet or other team related playing implement, and (7) a plurality of transparently backed decals which can be applied to windows or bug-deflector hood shields.

In the second and preferred embodiment, a motor vehicle manufacturer would outfit an existing make and model from its stock line with a predetermined exterior paint scheme which corresponds with a team's colors. To efficiently paint a vehicle body part on an assembly line process, each motor vehicle body part is given at least a primary and a secondary color designation. A primary color designation corresponds to the predominant or base color that the team has chosen as one of its home colors (usually found as the predominant color on the headgear or jerseys of a home team). A secondary color designation corresponds to a color used to ornament the designs, logos or trademarks found upon the base color.

For example, the Philadelphia Eagles of the National Football League have green and silver home colors on helmets ornamented with eagle wings. The green is found upon their helmets as a base color; the wings are silver. Any additional colors found in the team designs, such as white trim on the eagle wings, may be given sequential tertiary, quaternary, etc., designations. Thus, a motor vehicle body part to be painted is given a designation of 1°, 2°, or 3°, or higher to correspond with the primary, secondary, tertiary or other designation given to each color found in the team's identifying colors.

In this manner, each paint color can be applied to the automobile body part so that the number associated with a body part corresponds to the rank of the color, yielding a uniform paint job for stock makes and models regardless of the colors of the teams chosen. Then, the motor vehicle is outfitted to include the features found in the kit of the second embodiment.

The second embodiment's kit includes devices which are installed by the factory or dealer into a motor vehicle so as to create the vehicle customized to a buyer's order. The vehicle kit would include, in addition to the items included in the first embodiment, the following: (1) a mobile telephone shaped as a playing implement relating to the chosen sports team; (2) a portable ice chest form-fitted to the interior walls found behind the back seat and in the rear of the vehicle which has a "tailgate" or rear opening closure; (3) a roof-top cargo carrier shaped like a playing implement of the team, usually a ball; and (4) an additional bank of electrical plug outlets located in the rear interior wall panels in the storage area behind the rear seat to supply power to the mini-light string and various appliances useful at tailgate parties.

It is recognized that for a motor vehicle to carry the trademarks, logos and other designs of others to which intellectual property rights attach, licenses would be required from their owners. Under those circumstances, vehicles sporting the special paint scheme and features of the second embodiment above would also carry a medallion on the interior, preferably mounted on the dashboard, indicating the "official" or "limited" edition model as ordered by a buyer.

Furthermore, the devices included in the second embodiment that relate to standard interior parts of the motor vehicle, such as gear shift lever knobs, seat covers, floor mats, wheel cover decals and sunvisor decals, can be adapted to be a permanent, rather than removable, part of the vehicle. For example, the seat covers with sports design, ordinarily removable, may be substituted with an upholstery with a sports design. Sunvisor decals can be directly printed upon the sunvisors. Wheel covers with the official governing body logo can be substituted for hub cap decals. Affixed gear shift lever knobs can be molded to the shape of a ball or puck. Furthermore, molded interior body panels can be matched in color to those of the exterior colors.

Because many motor vehicles today can be ordered with standard paint schemes that resemble the color combinations of sports teams, the consumer may wish to purchase those vehicles without the factory or dealer installed options of the second embodiment. The third embodiment of the kit includes each of the devices in the first embodiment and the devices of second embodiment with two modifications. The first modification would include an added wiring and molding trim kit for the purpose of retrofit addition of a bank of electrical plug outlets to the rear interior panels. This kit would allow wiring of the plug bank into the rear tail lights of the vehicle and provide a neat appearance in the molding trim detail. Second, the official medallion would be eliminated.

Accordingly, it is an object of the present invention to provide a kit and means for outfitting stock motor vehicles with a sports theme to enhance the amusement and enjoyment of tailgate parties and sporting events and promote sports fan loyalty.

It is another object of the present invention to provide a kit and means for outfitting stock motor vehicles with a sports theme for installation by a motor vehicle manufacturer or dealer.

It is a further object of the present invention to provide a retrofit installation kit and means for outfitting stock motor vehicles with a sports theme.

Still another object of the present invention is to provide a kit and means for outfitting stock motor vehicles with a sports theme which may be either permanently or temporarily applied to the motor vehicle.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
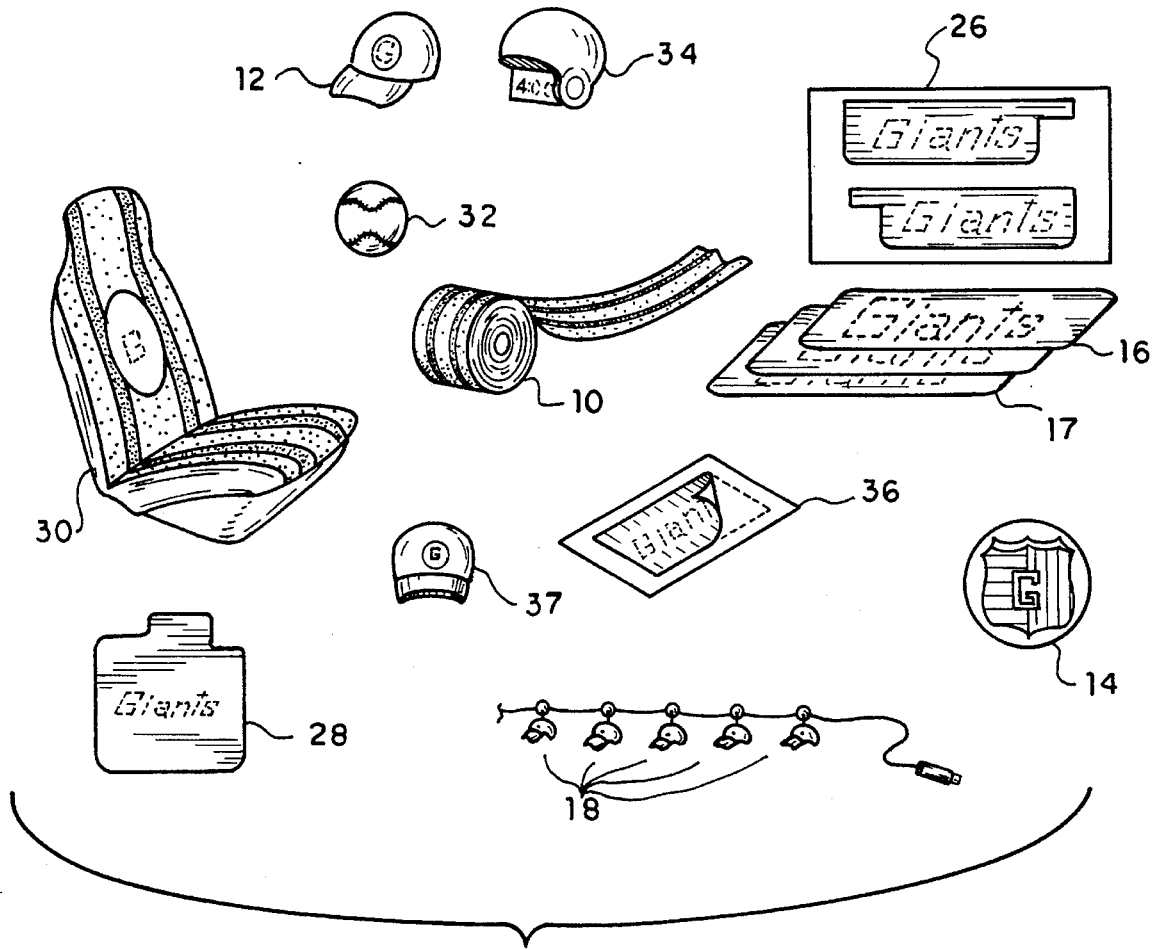
FIG. 1 is a diagrammatic representation of the combination of items in the kit of the first embodiment.

The present invention provides a kit and means of outfitting a stock motor vehicle with decorative features that would attract or enthuse fans of a sports franchise or sports team. Referring now to FIG. 1, a first embodiment of the kit is shown as would be provided to a consumer baseball fan for application to any type of motor vehicle make or model. A roll of wide flexible tape 10 is shown decorated with a plurality of stripes in one baseball team's colors. This roll is provided in a predetermined length (preferably in excess of the circumference around the sides of a standard sports utility vehicle) and in a predetermined width (preferably 6 inches so as to adequately accommodate distant viewing of the number of stripes normally found on a team's football helmet stripe or the stripes used on a sport's team jersey). The tape may be made of magnetic sheet material of suitable thickness for temporary adhesion to a ferrous body panel of a vehicle. In the alternative, standard "peel and stick" plastic sheet material with a permanent adhesive covered by a release liner can be used. Either tape can be trimmed by the consumer to the desired length.

Next, circular hub cap decals 14 would preferably display the logo or trademark of baseball's governing body, Major League Baseball, (the well known stylized batter and ball). A generic logo is shown. The kit would preferably contain a sheet of multiple "peel and stick" decals made of an opaque plastic sheet material (so as to be able to occlude surface ornamentation on the wheel cover) with an adhesive backing. A standard circular size cut-out may be provided for the consumer's convenience; however the decal material may be trimmed to size by the consumer.

A plurality of generally rectangular stickers 16 and signs 17 displaying a team name or logo are included for either permanent or temporary application to the side exterior body panels of the vehicle. The signs 17 are made of flexible magnetic sheet materials that temporarily adhere to ferrous exterior body panels of the vehicle. The stickers 16 are opaque plastic sheet material with adhesive backings for application to non-magnetic body panels. Similarly, sunvisor decals 26 are provided in the shape of a sunvisor so as to cover the entirety of the sunvisor. The sunvisor decals 26 have an adhesive backing and are cut from a plastic sheet material that can be trimmed to the exact size of the visor.

A plurality of transparent decals are included for application to windows or bug-deflector shields. The decals may consist of a type of plastic film 37 that frictionally adheres to glass without use of a glue so as to be removable, or be backed by an adhesive for permanent adhesion 36.

The kit further contains a hood ornament 12, shown shaped as a baseball cap. If a mascot of the baseball team is available, the preferred hood ornament would be shaped as the mascot. Any standard means of attaching the hood ornament to the hood of a vehicle may be used.

Figure 4:
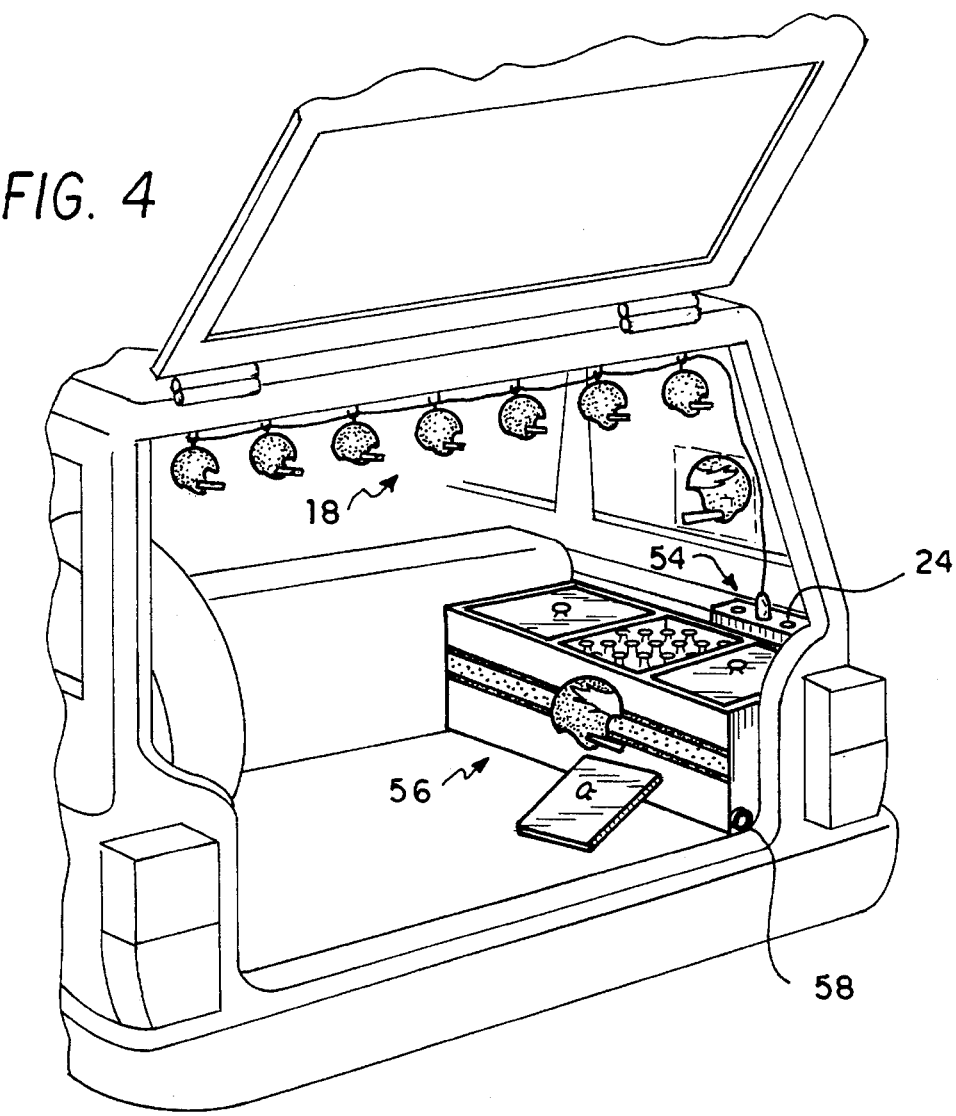
FIG. 4 is a perspective view of one embodiment of the tailgate area of the interior of a vehicle ornamented with a sports theme.
Figure 5:
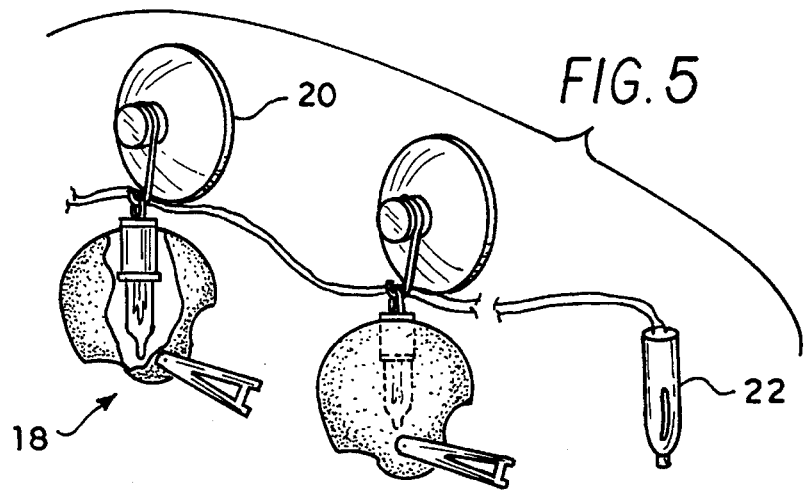
FIG. 5 is a perspective view of a sports theme lighting accessory.

FIG. 1 further represents a string of decorative mini-lights 18 with a shade in the shape of a team's baseball batting helmet. However, as can best be appreciated from FIG. 5, the mini-lights (shown in the football helmet theme) have a suction cup 20 for attachment to glass, and an adapter 22 for use with a motor vehicle plug outlet 24 (as shown in FIG. 4). Referring again to FIG. 1, standard floor mats 28 for displaying the team colors and logo are included. Standard seat covers 30 displaying the team colors and logo are also included. A gear shift lever knob 32 in the shape of a baseball is included. On many vehicles, a standard gear shift lever knob simply unscrews and can be replaced with a replacement knob. A clock shaped in the form of generic protective helmet 34 is shown, but a batting helmet or baseball shape may be used instead. The clock may also include a peel and stick adhesive bottom for attachment to a dashboard, although other attachment means may be substituted.

Figure 2:
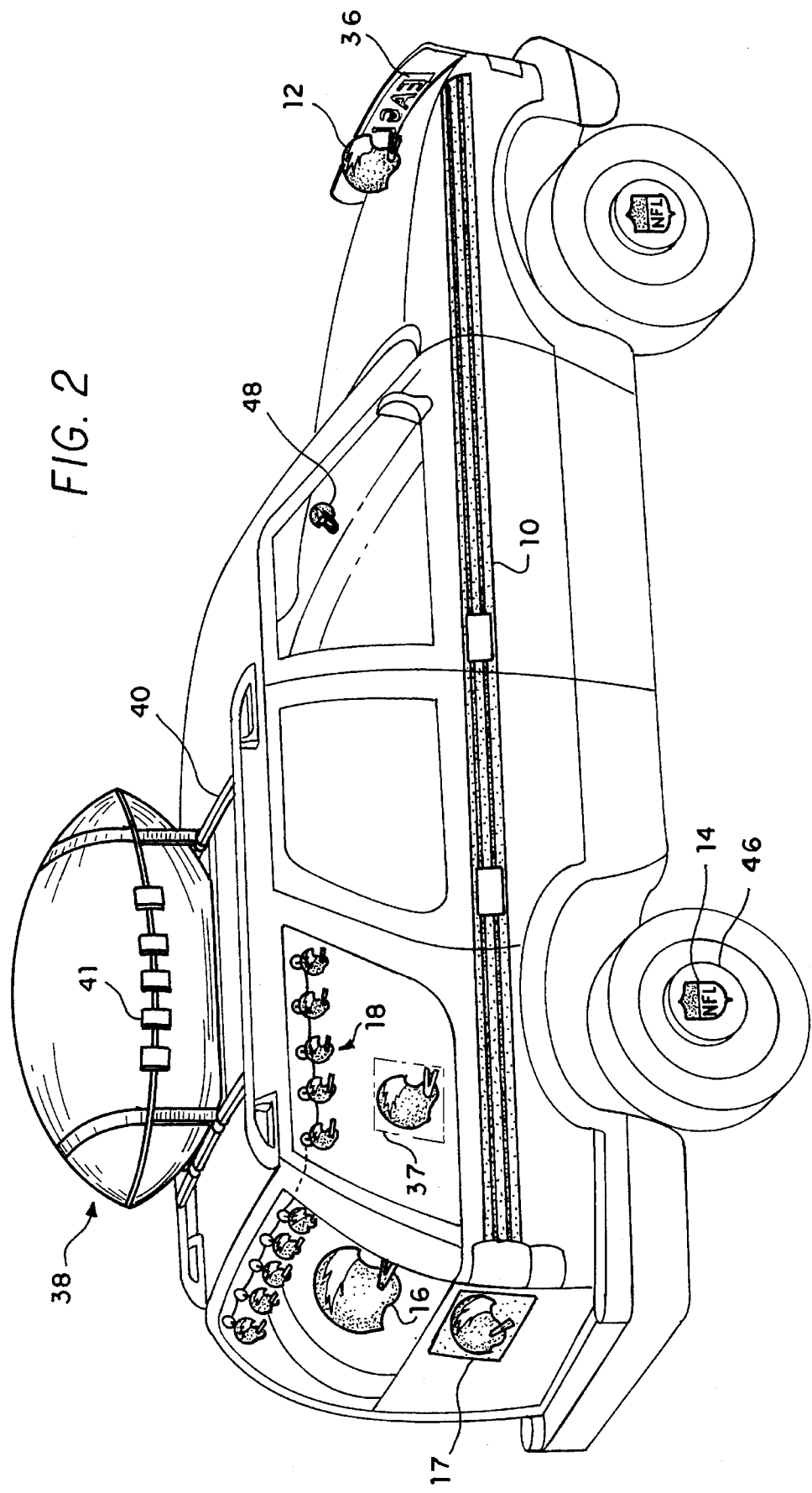
FIG. 2 is a perspective view of one embodiment of the exterior of a vehicle ornamented with a sports theme.
Figure 3:
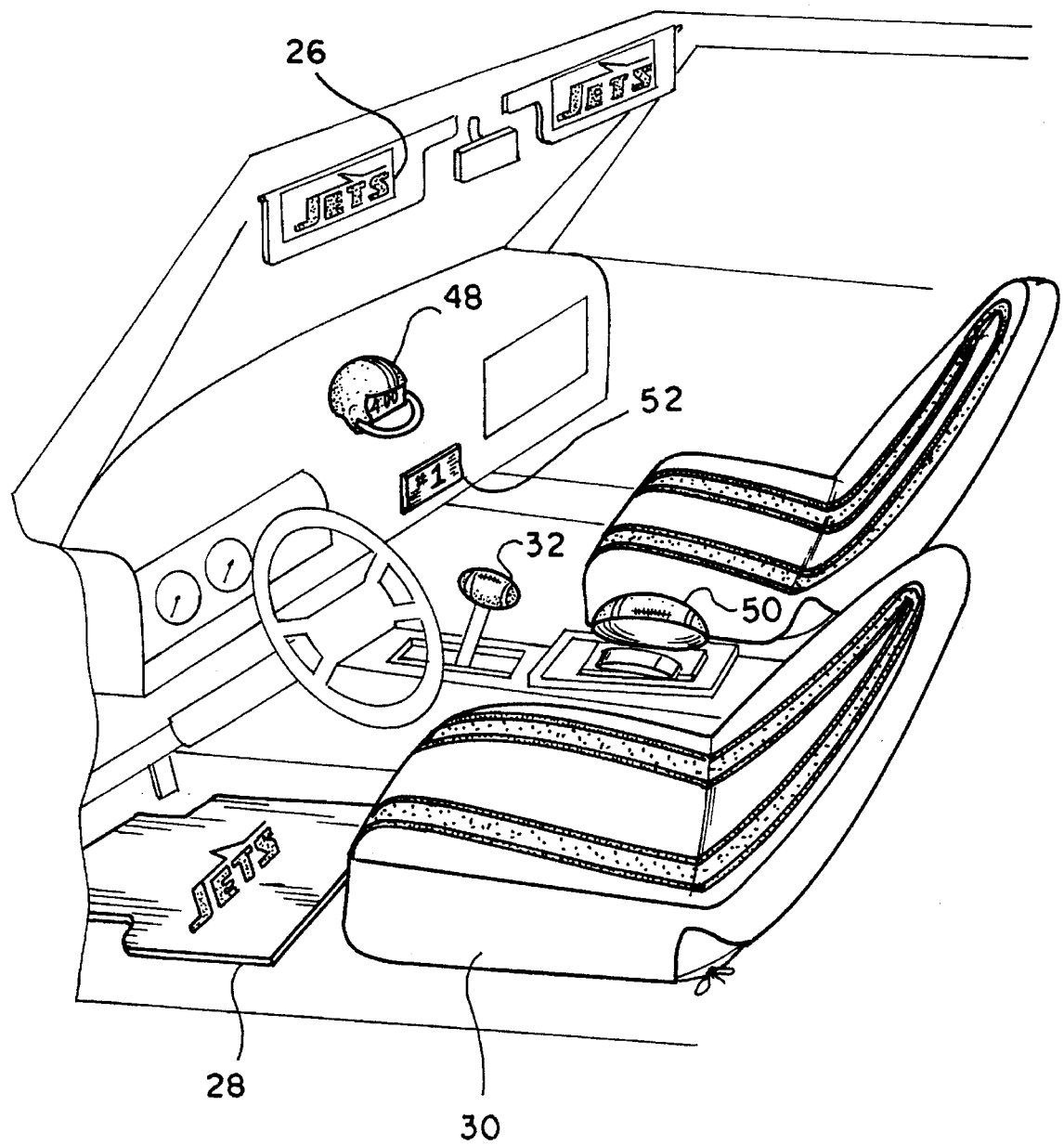
FIG. 3 is a perspective view of one embodiment of the passenger area of the interior of a vehicle ornamented with a sports theme.

FIGS. 2, 3, and 4 show the second embodiment of the kit as installed on a motor vehicle. In FIG. 2, a roof-top cargo carrier 38 shaped like a football is shown detachably mounted on a standard roof rack 40 of the vehicle. The roof carrier is hinged so as to open in the plane of the roof of the vehicle. The carrier's latches 41 are cleverly camouflaged as the laces of the football. A clear backed decal 36 is shown adhered to a standard bug deflector shield. A spare tire cover is shown displaying an adhesive backed decal 16. Wheel covers 46 display an NFL decal 14. The side body panels of the vehicle sport the striped tape 10.

On the interior of the passenger space of the vehicle (see FIG. 3), a football helmet clock 48 is shown adhered to the dashboard. The gear shift lever knob 32 and a mobile telephone 50 are shaped like a football. The sunvisor decals 26 are applied. Standard floor mats 28 and seat covers 30 displaying football team logos or colors. A medallion 52 is shown indicating the official licensing of the products.

FIG. 4 illustrates a "tailgate" storage area. In the tailgate area, a string of mini-lights 18 adorn the ceiling of the vehicle. The mini-lights 18 are powered by the bank of 12-volt direct current electrical plug outlets 54 which are installed in the interior side wall panel of the tailgate area. When the electrical plug outlets 54 are installed from the retrofit kit, a tail light wiring assembly connects the plugs to the existing wiring. Along the same side wall, a removable ice chest 56 has been specially molded to fit snugly within the recesses formed by the vehicle's normal contours. A drainage spout 58 is shown for convenient draining of fluid from the chest.

It is to be understood that the present invention is not limited to the embodiments described above, but encompasses any and all embodiments within the scope of the following claims.

I claim:

1. An after-market customizing coordinated kit for outfitting a motor vehicle with a sports theme, comprising:

a tape printed with indicia representing a sports team, including a predetermined plurality of stripes in the colors identifying the sports team, said tape for decorating a motor vehicle by adhering to exterior body parts thereof;

a plurality of opaque sheet materials printed with a plurality of indicia selected from the group consisting of a sports team, a sports figure, and a sport's teams governing body, a plurality of transparent sheet materials printed with a plurality of indicia selected from the group consisting of a sports team and a sports figure;

wherein said opaque and transparent sheet materials further comprises sheets of predetermined size to enable convenient consumer packaging, said sheet materials further including scored lines circumscribing areas of said printed indicia to enable removal of said areas from said sheet materials for application to predetermined parts of the motor vehicle;

a gear shift lever knob shaped to resemble an implement used in playing a sport;

a clock shaped to resemble an implement used in playing a sport;

a sports medallion for attachment to the interior of the motor vehicle; and a hood ornament shaped to resemble an implement used in playing a sport.

2. The kit according to claim 1, wherein said sheet material is flexible and backed with an adhesive; said adhesive being removably covered by a release liner for protection of said adhesive until the sheet material is ready to be adhered to the motor vehicle.

3. The kit according to claim 1, wherein said sheet materials are flexible and magnetic.

4. The kit according to claim 1, wherein said scored lines are dimensioned and configured to the general size and shape of a sun visor of a motor vehicle.

5. The kit according to claim 1, wherein said opaque sheet materials are printed with indicia representing a sports team's governing body in a generally circular area for application to the center of a motor vehicle's wheel covers.

6. The kit according to claim 1, further comprising a string of direct current electric mini-lights, said string of mini-lights including a decorative shade, a means of attachment to a smooth surface and an adaptor for use with a direct current motor vehicle plug outlet.

7. The kit according to claim 6, wherein the decorative shade is shaped to resemble an implement used in playing a sport and wherein said means of attachment is a suction cup removably attached to said string of mini-lights.

8. The kit according to claim 1, further comprising floor mats displaying indicia selected from the group consisting of a sports team and a sports figure.

9. The kit according to claim 1, further comprising seat covers displaying indicia selected from the group consisting of a sports team and a sports figure.

10. The kit according to claim 1, further comprising a mobile telephone shaped as an implement used in playing a sport.

11. The kit according to claim 1, further comprising a portable ice chest form-fitted to the interior side walls behind the back seat and in the rear of the vehicle having a rear closure.

12. The kit according to claim 1, further comprising a roof-top containerized cargo carrier shaped like an implement used in playing a sport.

13. The kit according to claim.17, wherein the roof-top container is shaped to resemble a football and includes a plurality of closure means configured and arranged in proximity to each other to simulate laces of a football.

* * * * *